No. 838,939. PATENTED DEC. 18, 1906.
O. BECKER.
LIGHT TIGHT PACKET FOR PHOTOGRAPHIC SENSITIZED SURFACES.
APPLICATION FILED JUNE 15, 1905.
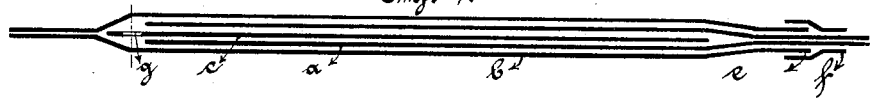
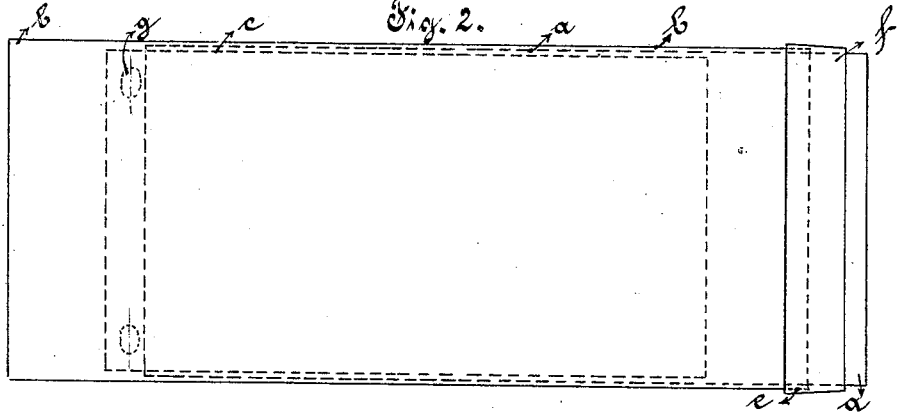
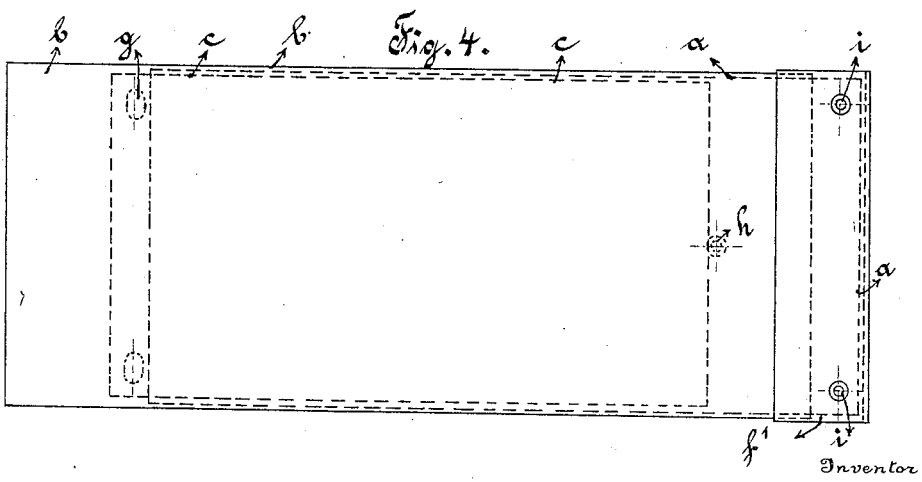
Inventor
Oscar Becker
Witnesses
T. P. Britt
E. C. Duffy
By O. E. Duffy & Son
Attorneys

UNITED STATES PATENT OFFICE.

OSCAR BECKER, OF BERLIN, GERMANY.

LIGHT-TIGHT PACKET FOR PHOTOGRAPHIC SENSITIZED SURFACES.

No. 838,939.   Specification of Letters Patent.   Patented Dec. 18, 1906.

Application filed June 15, 1905. Serial No. 265,410.

*To all whom it may concern:*

Be it known that I, OSCAR BECKER, a subject of the German Emperor, residing at 62 Jerusalemerstrasse, Berlin, S. W. 19, in the German Empire, have invented certain new and useful Improvements in Light-Tight Packets for Photographic Sensitized Surfaces, of which the following is a specification.

This invention relates to a light-tight packet for photographic sensitized surfaces, such as films or paper. The packet is such that it can be introduced, with the sensitized surface inside it, into the photographic apparatus, constructed in a particular manner for the purpose, as will be presently described, and the enveloping material of which the packet is formed may then be withdrawn from the sensitized surface to expose the latter.

The packet consists of two envelops of suitable light-tight material, such as black paper or card, capable of being slipped one inside the other. Each envelop is open at one edge only, and the film or the like having been placed in the envelop which is to be the inner one this envelop is introduced into the other one with its open edge innermost. When the packet containing the film has been placed in the photographic apparatus, the two packets may be withdrawn and the film left ready for exposure.

One of the advantages which this packet has over other forms of enveloping devices for sensitized surfaces resides mainly in the fact that in such other forms a part of the enveloping material must remain connected with the surface during the exposure, occupying space in the magazine into which such surfaces are generally transferred after exposure.

To provide for the retention of the film or the like in place while the inner envelop is being withdrawn, the outer one having been withdrawn first, the film may have one or more perforations which are not covered by the inner envelop, and are for the purpose of receiving as soon as the outer envelop is withdrawn some form of detent, such as spring-pins, carried by the photographic apparatus into which the packet has been introduced.

In order to insure that the packet shall be light-tight, the inner envelop may be provided at that of its closed sides which is opposite to its open side with pockets of suitable material, into which the edges of the open side of the outer envelop may slide, or the edges of the open side of the outer envelop may be gummed or otherwise fastened to the inner envelop at this part and may be cut open before using the packet.

The accompanying drawings illustrate the invention, in which—

Figure 1 is a longitudinal section, and Fig. 2 is a front elevation, of the packet; and Figs. 3 and 4 are like views, respectively, of a modification.

Referring to Figs. 1 and 2, the packet consists of two envelops of light-tight paper which fit into each other as do the parts of a sliding cigar-case. The inner pocket $a$, which is open at one edge only—namely, that which is to the left hand in the figures—and is closed light-tight at all its other edges, receives the film $c$, and said packet is of such length as to leave uncovered the perforations $g$ in the film, or the latter may be pushed into the envelop only as far as these perforations, as is shown in the drawings. The edge opposite the open edge is extended to form a handle, by which the envelop may be seized in order to withdraw it. When the film has been placed in this envelop $a$, the latter is pushed into the outer envelop $b$, which is not long enough to cover what has just been described as the handle of envelop $a$. Envelop $b$ is also provided with an extension to serve as a handle at that of its closed edges which is opposite its open edges. The edges $e$ of the envelop $b$ at its open side are connected with the outer surfaces of the envelop $a$ by a strip of gummed paper $f$.

In the modification shown in Figs. 3 and 4 a small rivet $h$ is passed through the inner envelop $a$ to serve as a stop, preventing film $c$ from passing so far into the envelop that the perforations $g$ are covered thereby. In this form a pocket $f'$ of suitable material is passed over the handle extension of envelop $a$ and held thereto by rivets $i$. The edges of envelop $b$ are slipped into this pocket and may be gummed thereto.

It will be obvious that the photographic apparatus in conjunction with which this packet is to be used must be constructed with suitable slits through which the packet can be inserted and the envelops withdrawn and that these slits must be closed light-tight as soon as the envelops have been withdrawn. For instance, the plate-holder, camera, or printing-frame may be made in two parts, one capable of sliding to and from the other.

The packet having been inserted between these two parts, with the handle extension protruding on either side, the gummed paper $f$ is cut and the outer envelop is withdrawn first, whereupon the slit through which it passes closes under spring-pressure and spring-pins carried by the apparatus at once engage in the perforations $g$. The inner envelop may now be withdrawn through the slit through which it passes and the film is left ready for exposure. It is not necessary to describe in greater detail the construction of such an apparatus, because one is described and illustrated in my patent application of even date herewith, Serial No. 265,409.

Having thus described the nature of my said invention, what I claim, and desire to secure by Letters Patent of the United States, is—

1. A light-tight packet for a photographic sensitized surface which consists of an envelop open at one side only, a handle extension at the side of the said envelop opposite the open side, a second envelop open at one side only, and a handle extension at the side of the said second envelop opposite the open side, the said second envelop being adapted to slide with open side innermost within the said first envelop, substantially as described.

2. In combination, a photographic sensitized surface having perforations at one part, an envelop open at one side only adapted to receive the said surface and to cover all of it save the perforated part, and a second envelop open at one side only adapted to receive the said envelop containing the said surface, substantially as described.

3. In combination, a photographic sensitized surface having perforations at one part, an envelop open at one side only adapted to receive the said surface and to cover all of it save the perforated part, and a second envelop open at one side only adapted to receive the said envelop containing the said surface, and a handle extension to each envelop at the side opposite the open side, substantially as described.

4. A light-tight packet for a photographic sensitized surface which consists of an envelop open at one side only, a second envelop open at one side only and adapted to slide with its open end innermost into the said first envelop, a handle extension to each of the said envelops at the side opposite the open side, and a strip holding the edges of the open side of the said first envelop against the outer surfaces of the said second envelop, substantially as described.

5. A light-tight packet for a photographic sensitized surface which consists of an envelop open at one side only, a second envelop open at one side only and adapted to slide with its open end innermost into the said first envelop, a handle extension to each of the said envelops at the side opposite the open side, and a stop in the said second envelop, substantially as described.

6. A light-tight packet for a photographic sensitized surface which consists of an envelop open at one side only, a second envelop open at one side only and adapted to slide with its open end innermost into the said first envelop, a handle extension to each of the said envelops at the side opposite the open side, a stop in the said second envelop, and a pocket riveted over the handle extension of the said second envelop, substantially as described.

7. In combination, a photographic sensitized surface having perforations at one part, an envelop open at one side only adapted to receive the said surface, a stop in the said envelop, a second envelop open at one side only and adapted to receive the said envelop containing the said surface, a handle extension to each envelop at the side opposite the open side, and a pocket riveted over the handle extension to the said first envelop and adapted to receive the edges of the open side of the said second envelop, substantially as described.

In testimony whereof I have signed my name to this specification in the presence of two subscribing witnesses.

OSCAR BECKER.

Witnesses:
WOLDEMAR HAUPT,
HENRY HASPER.